(12) United States Patent
Ghahramani et al.

(10) Patent No.: US 12,217,179 B2
(45) Date of Patent: Feb. 4, 2025

(54) INTELLIGENT REGULARIZATION OF NEURAL NETWORK ARCHITECTURES

(71) Applicant: Uber Technologies, Inc., San Francisco, CA (US)

(72) Inventors: Zoubin Ghahramani, Cambridge (GB); Douglas Bemis, San Francisco, CA (US); Theofanis Karaletsos, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 18/372,415

(22) Filed: Sep. 25, 2023

(65) Prior Publication Data

US 2024/0013049 A1 Jan. 11, 2024

Related U.S. Application Data

(63) Continuation of application No. 17/513,517, filed on Oct. 28, 2021, now Pat. No. 11,829,876, which is a continuation of application No. 15/789,898, filed on Oct. 20, 2017, now Pat. No. 11,164,076.

(60) Provisional application No. 62/451,818, filed on Jan. 30, 2017, provisional application No. 62/410,393, filed on Oct. 20, 2016.

(51) Int. Cl.
| | |
|---|---|
| *G06N 3/08* | (2023.01) |
| *G06N 3/04* | (2023.01) |
| *G06N 3/045* | (2023.01) |
| *G06N 3/082* | (2023.01) |
| *G06N 3/0985* | (2023.01) |
| *G06N 7/01* | (2023.01) |

(52) U.S. Cl.
CPC ............... *G06N 3/08* (2013.01); *G06N 3/045* (2023.01); *G06N 3/082* (2013.01); *G06N 3/0985* (2023.01); *G06N 7/01* (2023.01)

(58) Field of Classification Search
CPC .......... G06N 3/045; G06N 3/08; G06N 3/082; G06N 3/096; G06N 3/0985
See application file for complete search history.

(56) References Cited

U.S. PATENT DOCUMENTS

2020/0184337 A1 6/2020 Baker

OTHER PUBLICATIONS

United States Office Action, U.S. Appl. No. 15/789,898, filed Mar. 8, 2021, seven pages.

*Primary Examiner* — Hal Schnee
(74) *Attorney, Agent, or Firm* — Fenwick & West LLP

(57) ABSTRACT

A trained computer model includes a direct network and an indirect network. The indirect network generates expected weights or an expected weight distribution for the nodes and layers of the direct network. These expected characteristics may be used to regularize training of the direct network weights and encourage the direct network weights towards those expected, or predicted by the indirect network. Alternatively, the expected weight distribution may be used to probabilistically predict the output of the direct network according to the likelihood of different weights or weight sets provided by the expected weight distribution. The output may be generated by sampling weight sets from the distribution and evaluating the sampled weight sets.

20 Claims, 7 Drawing Sheets

INTELLIGENT REGULARIZATION OF NEURAL NETWORK ARCHITECTURES

CROSS REFERENCE TO RELATED APPLICATIONS

This application is a continuation of U.S. application Ser. No. 17/513,517, filed on Oct. 28, 2021, which claims the benefit of U.S. application Ser. No. 15/789,898, filed Oct. 20, 2017 (now U.S. Pat. No. 11,164,076) which claims the benefit of U.S. Provisional Application No. 62/410,393, filed Oct. 20, 2016, and U.S. Provisional Application No. 62/451,818, filed Jan. 30, 2017, each of which is incorporated by reference in its entirety.

BACKGROUND

This specification relates generally to machine learning and more specifically to training systems such as neural networks.

Computer models, such as neural networks, learn mappings between a set of inputs to a set of outputs according to a function. In the case of a neural network, each processing element (also called a node or hidden element) may apply its own function according to a set of weights for the function for the processing element. The mapping is considered a "direct" mapping, representing a function that translates the set of inputs to a set of outputs. The mapping is represented by a set of weights for the function to translate the inputs to the outputs. Many problems in machine learning, statistics, data science, pattern recognition, and artificial intelligence involve the representation and learning of mappings. A mapping is a transformation that, for example, may map from images to images for de-noising, from images to the labels of the objects in the images, from English sentences to French sentences, from states of a game to actions required to win the game, or from vehicle sensors to driving actions. In general, both the input to a mapping and the output of the mapping are represented as digitally-encoded arrays.

A function f maps an input x to an output y. Thus we have the following as a general expression of the idea that function f maps input x (e.g., an image of a cat, digitally represented as an array of pixels) to output y (e.g., the label "cat" as a word):

$$y = f(x) \qquad \text{Equation 1}$$

Such mappings may be represented with artificial neural networks which transform the input x to the output y via a sequence of simple mathematical operations involving summing inputs and nonlinear transformations. Mappings employed in machine learning, statistics, data science, pattern recognition, and artificial intelligence may be defined in terms of a collection of parameters, also termed weights w for performing the mapping. The weights w define the parameters of such a mapping, e.g., y=f(x,w). In a neutral network, these parameters reflect weights accorded to different inputs x to the function for parameters of the function itself to generate the output of the network. Though the network as a whole may be considered to have weights, individual nodes (or "hidden units") of the network each individually operate on a set of inputs to generate an output for that node according to weights of that node.

Neural network architectures commonly have layers, where the overall mapping of the neural network is composed of the composition of the mapping in each layer through the nodes of each layer. Thus the mapping of an L layer neural network can be written as follows:

$$y = f(x) = f_L(f_{L-1} \ldots (f_1(x)))) \qquad \text{Equation 2}$$

where $f^i$ denotes the mapping computed by the Lth layer. In other words, the initial input undergoes successive transformations by each layer into a new array of values.

Referring to FIG. 1, an exemplary neural network 100 is illustrated. As shown, the network 100 comprises an input layer 110, an output layer 150 and one hidden layer 130. In this example, the input layer is a 2-dimensional matrix having lengths P×P, and the output layer 150 is a 2-dimensional matrix having lengths Q×Q. For each processing layer, a set of inputs x to the layer are processed by nodes of the layer according to a function f with weights w to outputs y of the layer. The outputs of each layer may then become inputs to a subsequent layer. The set of inputs x at each layer may thus be a single value, an array, vector, or matrix of values, and the set of outputs y at each layer may also be a single value, an array, vector, or matrix of values. Thus, in this example, an input node 111 in the input layer 110 represents a value from a data input to the network, a hidden node 131 in the hidden layer 130 represents a value generated by the weights 121 for node 131 in the hidden layer applied to the input layer 110, and output node 151 represents an output value 151 from the network 100 generated by weights 141 for the node 151 applied to the hidden layer 130.

Although the weights are not individually designated in FIG. 1, each node in a layer may include its own set of weights for processing the values of the previous layer (e.g., the inputs to that node). Each node thus represents some function f, usually nonlinear transformations in each layer of the mapping, with associated weights w. In this example of a mapping the parameters w correspond to the collection of weights {w(1), ..., w(L)} defining the mapping, each being a matrix of weights for each layer. The weights may also be defined at a per-node or per-network level (e.g. where each layer has an associated matrix for its nodes).

During training, the weights w are learned from a training data set D of N examples of pairs of x and y observations, $D = \{(x_1, y_1) \ldots, (x_N, y_N)\}$. The goal of the network is to learn a function f through the layers of the network that approximate the mapping of inputs to outputs in the training set D and also generalize well to unseen test data $D_{test}$.

To learn the weights for the network and more learn the mapping, an error or loss function, E(w, D) evaluates a loss function L which measures the quality or the misfit of the generated outputs ŷ to the true output values y. One example error function may use a Euclidian norm:

$$E(w,D) = \mathcal{L}(y, f(x;w)) = \mathcal{L}(y, \hat{y}) = \|y - \hat{y}\|^2. \qquad \text{Equation 3}$$

Such an error function E can be minimized by starting from some initial parameter values (e.g., weights w), and then evaluating partial derivatives of E(w, D) with respect to the weights w and changing w in the direction given by these derivatives, a procedure called the steepest descent optimization algorithm.

$$w_t \leftarrow w_{t-1} - \eta_t \frac{\partial E(w, D)}{\partial w}\bigg|_{w_{t-1}}, \qquad \text{Equation 4}$$

Various optimization algorithms may be used for adjusting the weights w according to the error function E, such as stochastic gradients, variable adaptive step-sizes, secondorder derivatives or approximations thereof, etc. Likewise, the error function E may also be modified to include various additional terms.

One technique to improve learning of parametric functions, like neural networks, is the use of regularization. Regularization refers to a process which introduces additional information to the error function to prevent overfitting the network to data, solve ill-posed or underdetermined problems and guide parametric models to solutions consistent with a priori assumptions about the data. Regularization may be implemented as an additional regularization term of the error function.

Regularization may be employed in neural networks by assuming an adequate penalty R over the parameters and adding it to the error function weighted by a scalar regularization parameter $\lambda$. A number of penalty functions may be employed, such as various Lp-norms. As an example, the L2 norm and/or the L1 norm may be employed, and the loss-function may be described as follows:

$$E(w,D) = \mathcal{L}(y,\hat{y}) + \lambda R(w) = \mathcal{L}(y,\hat{y}) + \lambda \|w\|_p, \quad \text{Equation 5}$$

One examplary norm is the L2 norm, $$R(\omega) = \|w\|_2^2 = \sum_i w_i^2,$$

where each weight has an index i. This norm pushes the square values of individual weights towards zero and thus favours small weights. Another exemplary norm is the L1-norm, $$\|w\|_1 = \sum_i |w_i|,$$

which induces sparsity by penalizing the absolute values of weights. In these examples, a strength of the regularization parameter $\lambda$ is a global value that is typically chosen manually or via cross-validation or similar procedures. The regularization parameter $\lambda$ thus may control the strength of the effect of the regularization on the error function E.

Additional regularization may be performed by "dropout," which switches some number of hidden units (neural network processing units or atoms) stochastically during training and leads to models which more cleverly exploit the capacity of larger network to represent data.

Conventional regularization techniques suffer from a number of limitations and disadvantages which severely impact their practical usefulness across multiple applications when trying to learn mappings. For example, one known regularization technique considers shrinking weights to zero. This assumption makes sense for certain weights which could be pruned and ensures low model complexity.

However, in the case of the weights which carry information, shrinkage to zero may be detrimental when it pulls weights away from the values they are trying to reach to model underlying information. Typical regularizers are globally applied across weights or nodes of the network. This global regularization severely ignores the reality that, for most if not all applications, individual weights in neural networks may share structure with other weights and may have statistical dependencies which the regularizer ignores. In particular, if weight or parameter matrices exhibit structure or an inherent geometry these regularizers do not account for this structure or geometry and may prevent learning more effective weights for modeling the data.

Structure exists in various cases, for instance when modeling related tasks or domains of knowledge, e.g. in Multi-Task Learning (short: MTL) or Domain Adaptation, or whenever the data exhibits relatedness, which is true for most data sampled from the real world. Examples of MTL exist in most pattern recognition tasks: speech recognition across multiple speakers with different accents, autonomous driving commands for different makes of car, product recommendations for different users, robustness to visual variation across weather and location when recognizing scenes and more. Ignoring the inherent structure and relatedness can lead to dramatic losses in generalization and statistical power for these and other situations.

Finally, other conventional regularizers are manually configured and don't adapt to the data. An intelligent, adaptive regularization system must be able to capture properties relevant to the data which may not be known a priori.

In addition, learning of direct weights can be impacted by initial data sets (or batches) that train the date, and different weights may result from and be suggested by different data set orders. Systems which rigorously result in a single set of weights for the network may fail to account for these different weight sets, and be rigid and inflexible, failing to generalize well or account for missing data in an input to the network as a whole.

SUMMARY

A direct mapping for a network is learned in conjunction with an indirect network that designates expected weights for the direct mapping. The network generating the "direct mapping" may also be termed a "direct network" or a "direct model." The indirect network learns an expected weight distribution of the weights of the direct network, which may be represented as a set of "expected" weights for the direct mapping. The indirect network may also be termed an "indirect model." The direct model may include a portion of a larger modeled network, such as a multi-node, multi-layered neural network, wherein each direct network models transitions for one or more nodes in the network.

The indirect model generates the expected weight distribution based on a set of indirect parameters that affect how the indirect network models the direct network weights. In addition, the indirect model may also be generated based on a control input that describes characteristics of the direct model, such as the particular node, layer, type of input, or other aspect that conditions the generated weights. This indirect model may thus predict more general changes in the weights of the model that vary across the characteristics.

The indirect model thus produces "expected" weights and the distribution thereof and that may be used in various ways to improve the direct model for an input to an output.

In one approach, the indirect model is used to regularize the weights applied to the mapping in the direct network. In this approach, when training the model, the error term for the direct weights is regularized by the expected weights given by the indirect network. In this way, the indirect network provides an 'anchor' or set point from which the direct network weights may vary when it more accurately reflects the data.

In this configuration, the regularization term may preference a low difference (and penalizes a high one) between the expected weight and the actual weight of the network. The regularization function may take various forms, such as a linear or squared difference from the expected weights.

Rather than preferencing a "zero" term for weights, this regularization may thus simulate an L1 or L2 norm with respect to the expected weights generated by the indirect network. These may permit the regularization to provide a "spring" to the "anchored" expectation of the expected weights, encouraging direct weights that are consistent with the expected weights. The regularization may also be applied to the direct network weights based on a regularization parameter ($\lambda$) describing the preference for the expected weight compared to deviation accounting for the input data.

When training the models, the error term may thus be used to update the direct network as well as the indirect network. For example, the direct network may be updated based on a derivative of the error term with respect to the direct network weights, and the indirect network may be updated based on a derivative of the error term with respect to the indirect network parameters (which generate the expected weights).

The regularization parameter $\lambda$ itself may be an output of the indirect model. In this situation, the regularization parameter $\lambda$ reflects the uncertainty or deviation of actual weights in the direct network relative to the indirect network. In this case, expected weights and the regularization parameter $\lambda$ output by the indirect network may represent an expected Gaussian distribution of the weights in the direct network.

In additional embodiments, the indirect network may output any expected distribution of the network (e.g., values for the weights and associated probability of the weights) and use the expected distribution as a regularization of the direct weights. The regularization may not be a linear or non-linear function from a mean of the expected weight distribution, and may instead penalize weights according to the associated probability of the set of weights based on the distribution.

In further embodiments, the expected distribution of weights of the direct network (as output by the indirect network) is used to generate the outputs of the direct network. In this example, there may be no direct weights. Instead, the outputs of the direct network may be generated based on an integration over the distribution of weights given by the indirect network. In this configuration, the output of the indirect network (the expected weight distribution of the direct network) represents a probabilistic prior distribution of the direct network weights. Thus, rather than modeling the direct network with specific weights, the indirect network provides a distribution of these weights which may be used to effectively 'simulate' many possible sets of weights according to the possible distribution of these weights or by evaluating as the mean of the sample outputs. The integration and 'simulation' is performed by sampling from multiple points in the distribution of weights and determining the resulting output for the direct network based on each sampled set of weights. The different samples is then be combined according to the probability of the samples to generate the output of the direct network. Because the indirect network may learn the weights of the direct network as a distribution of 'possible' weights, the indirect network may more consistently learn the expected weights of the direct network and overreliance on initial training data or bias due to the ordering in which the training data is batched; the different direct network weights as encouraged by different sets of training data may now be effectively captured as different distributions of these weights in the direct weight distribution.

To train the expected distribution of weights for the direct network, an input is evaluated according to the expected prior weight distribution, and a loss function is used to evaluate updates to the distribution based on error to the data term generated from the prior weight distribution and error for an updated weight distribution. The loss function is used to update the expected prior distribution of direct weights and accordingly update the indirect parameters.

Using the indirect network to generate an expected weight distribution or expected weights for the direct model provides many advantages in the training and use of the direct network. First, the indirect network aids in the generation of transfer learning for different tasks. Since the indirect network predicts general expected characteristics of a network, the parameters for the indirect network may be used as initial expected parameters for training additional direct networks for different tasks. In this example, the indirect network may be used to initialize the weights for another direct network. In addition when designating a domain as a control parameter, either with or without latent control inputs, the new domain may readily incorporated by the control parameters for the indirect network because the training for the new domain may only require learning the differences from the prior domain while re-using the previously-learned aspects of the initial domain. In addition, the control inputs may define known properties or parameters of the environment in which the direct network is applied, and changes to those properties may be used to learn other data sets having other properties simply by designating the properties of the other data sets when learning the new data sets. In other examples, the indirect network jointly trained with multiple direct networks, permitting the indirect network to learn more general 'rules' for the direct networks and reflect an underlying or joint layer for the direct networks.

As additional benefits, the use of the indirect network to generate expected weights or general distributions of the direct networks also permits the indirect network to be trained more accurately with more limited training data.

In addition, the indirect network results in more flexible use cases of the direct network. If portions of a trained direct network are lost or no longer describe current data well, the indirect network can provide a "starting place" for generating weights without complete re-training of the direct network. Relatedly, when input data is missing or erroneous, the indirect network may be used to adapt the direct network to account for the missing input data. For example, the portions of the direct network that use that data, have high expected weights for that data, or high weight distributions that weigh that data highly, may be deactivated or adjusted to account for the missing data. For example, the expected weight distribution for the direct network may be evaluated and modified to reduce reliance on (or deactivate) portions of the direct network affected by the missing data. For example, an expected weight distribution for a direct network may be modified to exclude portions of the distribution that highly weigh the missing or affected inputs.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 2:
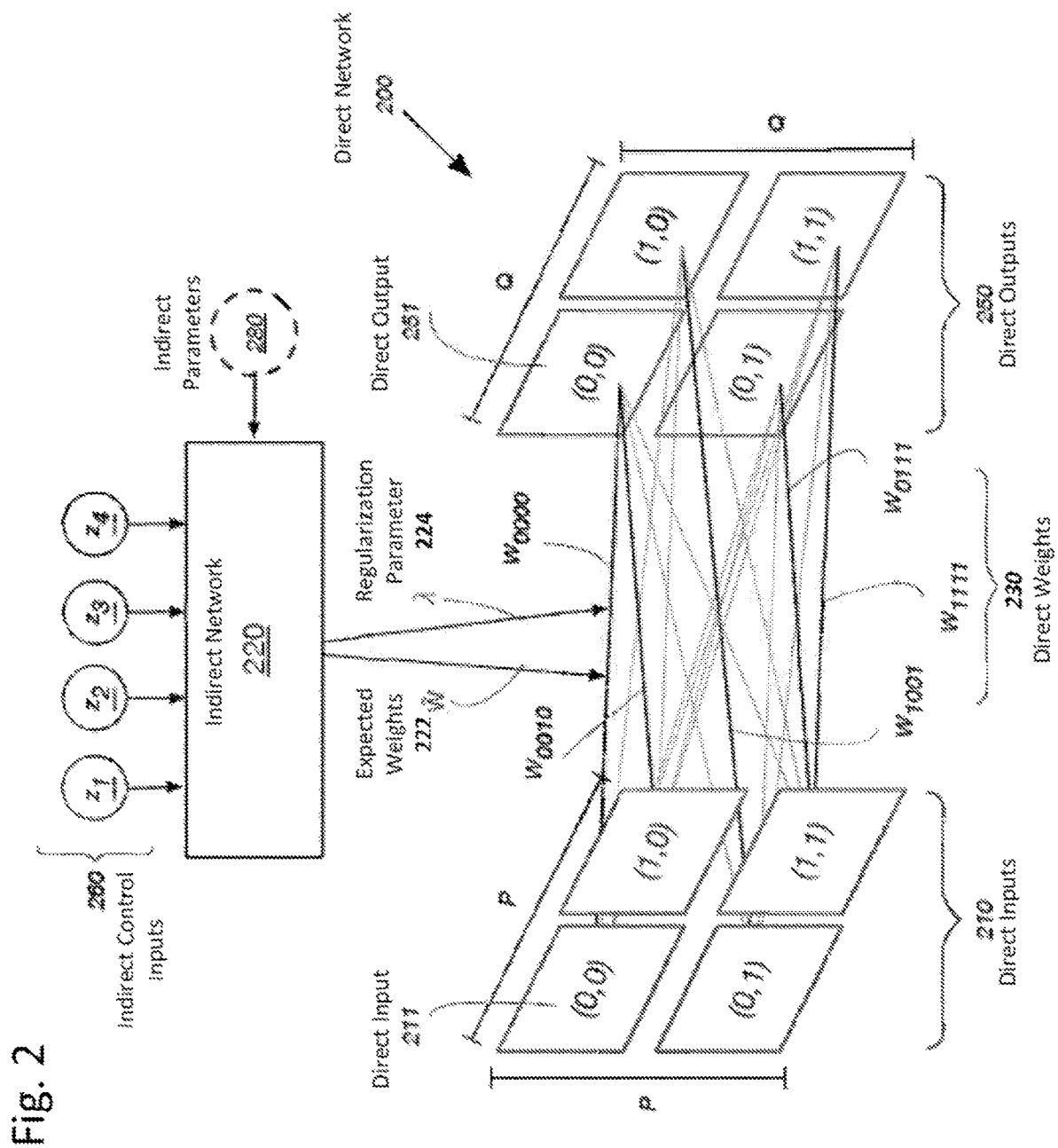
FIG. 2 illustrates a computer model that includes a direct network and an indirect network according to one embodiment.

FIG. 2 illustrates a computer model that includes a direct network and an indirect network, according to one embodiment. In this example, the computer model refers to the learned networks to learn from a data set D having inputs x and associated outputs y. These inputs and outputs thus represent data input and related data output of the dataset. In that sense, the modeling learns to generate a predicted output y from an input x.

As discussed more fully below, this computer model may include a direct network 200 and an indirect network 220. During training, the computer model may include both the direct network 200 and the indirect network 220. As discussed more fully below, the trained network itself may be applied in one example to unknown data with only the direct network and its weights, while in another example the trained network may be applied to new data with the indirect network and the structure of the direct network using predicted weights predicted an indirect network.

The direct network 200 implements a function f for mapping a set of direct inputs x 210 to a set of direct outputs y 250. As discussed above with respect to FIG. 1, the mapping of the direct inputs x to direct outputs y may be evaluated by applying direct weights w to the various nodes. In this example, a single layer is illustrated in which the direct outputs y 250 are generated by applying direct weights w to the direct inputs 210. For example, a direct input 211 may be used to generate one or more direct outputs 250, such as direct output 251, according to the direct weights related to the respective direct output 250.

Figure 1:
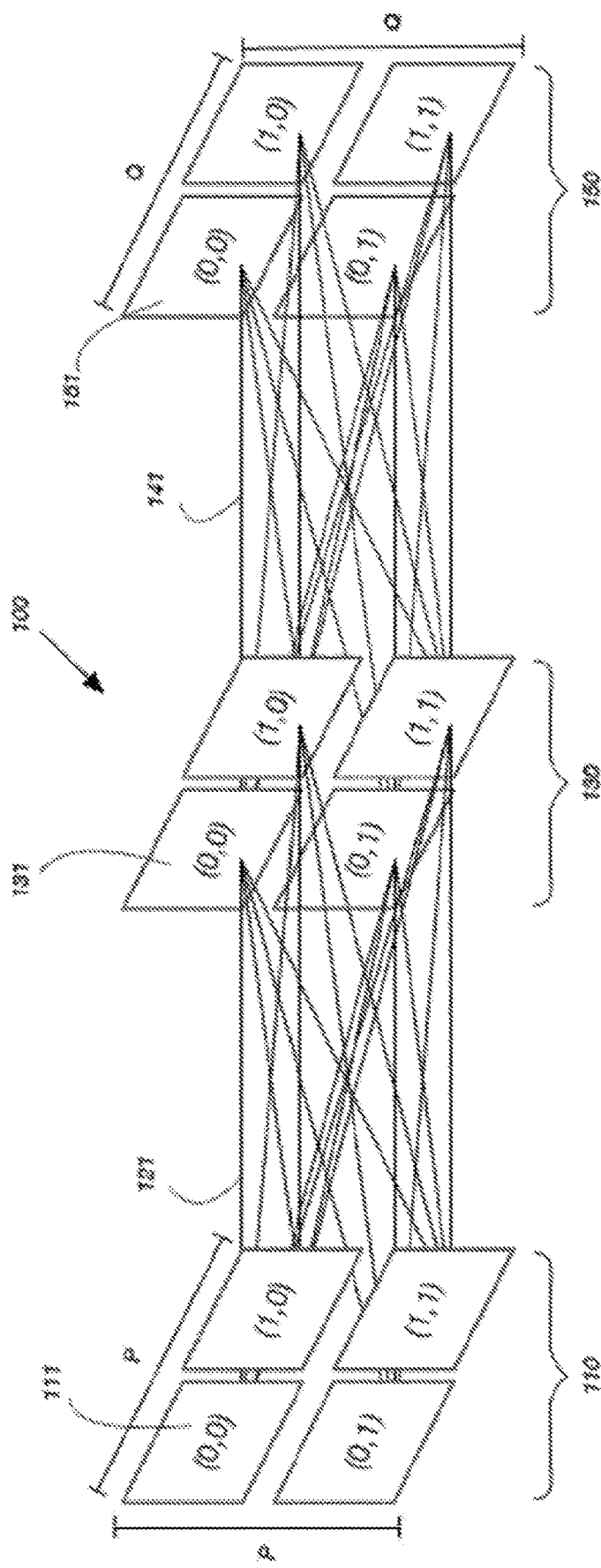
FIG. 1 illustrates an exemplary neural network.

As shown in FIG. 1, the direct network 200 is termed a "direct" network because its weights "directly" generate data outputs from data inputs. Put another way, the data input to the network model is entered as an initial layer of the direct network, and the output of the direct network is the desired output of the network model itself. Thus, for the training data D, its input input x is provided as the direct inputs 210, and training is expected to result in the values of direct outputs 250 matching the training data's associated output y.

The indirect network 220 generates an expected weight distribution $\Theta$ for the direct weights 230 of the direct network. The expected weight distribution $\Theta$ describes possible values of the weights of the direct network and probabilities associated with the possible values. In this way, the expected weight distribution $\Theta$ may also be considered to model a statistical prior of the direct weights and captures a belief about the distribution of the set of weights and may describe the dependence of each weight on the other weights. The expected weight distribution $\Theta$ may describe the possible values and associated probabilities as a function or as discrete values. As a result, rather than directly describing the function applied to the input x to generate the output y for a given set of weights in the direct network, the indirect network describes the expected weights themselves of the direct network.

The indirect network 220 is a learned computing network, and typically may be a neural network or other trainable system to output the expected weight distribution $\Theta$ for the set of weights w of the direct network. To parameterize the generation of the expected weight distribution, the indirect network may use a set of indirect parameters $\phi$ 280 designating how to apply the functions of the indirect network 220 in generating the expected weight distribution of the direct network. In addition, the indirect network 220 may also receive a set of indirect control inputs 260 that describe how to apply the indirect network to generate the expected weights. These indirect control inputs z 260 serve as an "input" to the indirect network 220, and provide an analog in the indirect network for the inputs x of the direct network. Stated another way, the indirect network provides a function g that outputs the expected weight distribution $\Theta$ as a function of the indirect parameters it, 280 and the indirect control inputs z 260. As a general formula, $g(\Theta|z, \phi)$. In some embodiments, the indirect network may be trained to generate the expected weight distribution without indirect control input z 260, or with a set of "dummy" or constant indirect control inputs.

The expected weight distribution $\Theta$ may take several forms according to the type of indirect network 220 and the resulting parameters generated by the indirect network. The expected weight distribution may follow various patterns or types, such as a Gaussian or other probabilistic distribution of the direct weights, and may be represented as a mixture model, multi-modal Gaussian, density function, a function fit from a histogram, any (normalized and unnormalized) implicit distribution resulting from draws of stochastic function and so forth. Accordingly, the expected weight distribution describes various sets of weights for the direct network and the relative likelihood of the different possible sets of weights. As one example, the expected weight distribution $\Theta$ may reflect a Gaussian or normal distribution of the direct weights, having a mean, standard deviation, and a variance. The expected weight distribution $\Theta$ may independently describe a distribution of each weight w, or may describe a multi-variate distribution of more than one direct weight w together.

The indirect network 220 may be structured as various types of networks or models. Though termed a network, the indirect network 220 may include alternate types of trainable models that generate the expected weight distribution $\Theta$. Thus, the indirect network 220 may include multivariate or univariate models. The indirect network 220 may be a parametric model or neural network, but may also apply to nonparametric models, such as kernel functions or Gaussian Processes, Mixture Density Networks, nearest neighbor techniques, lookup tables, decision trees, regression trees, point processes, and so forth. In general, various types of models may be used as the indirect network 220 that effectively characterize the expected weight distribution and have indirect parameters 280 that may be trained from errors in the output y predicted by the direct network.

The indirect control inputs z describe characteristics that may condition the generation of the expected weight distribution ⊖ of the direct network 200. These characteristics may describe various relevant information, for example describing a particular computing element or node of a larger network, a layer of the network, designate a portion of an input operated on by a given direct network, or a domain or function of the data set. As an example of a portion of an input, for an image or video input, different portions of the input may be separately processed, for example when the direct network performs a convolution or applies a kernel to the portion of the input. By varying the indirect control inputs, the indirect network may be used to effectively learn 'rules' that more generally describe the direct network data as it varies across the different characteristics described by the indirect control inputs.

Figure 3:
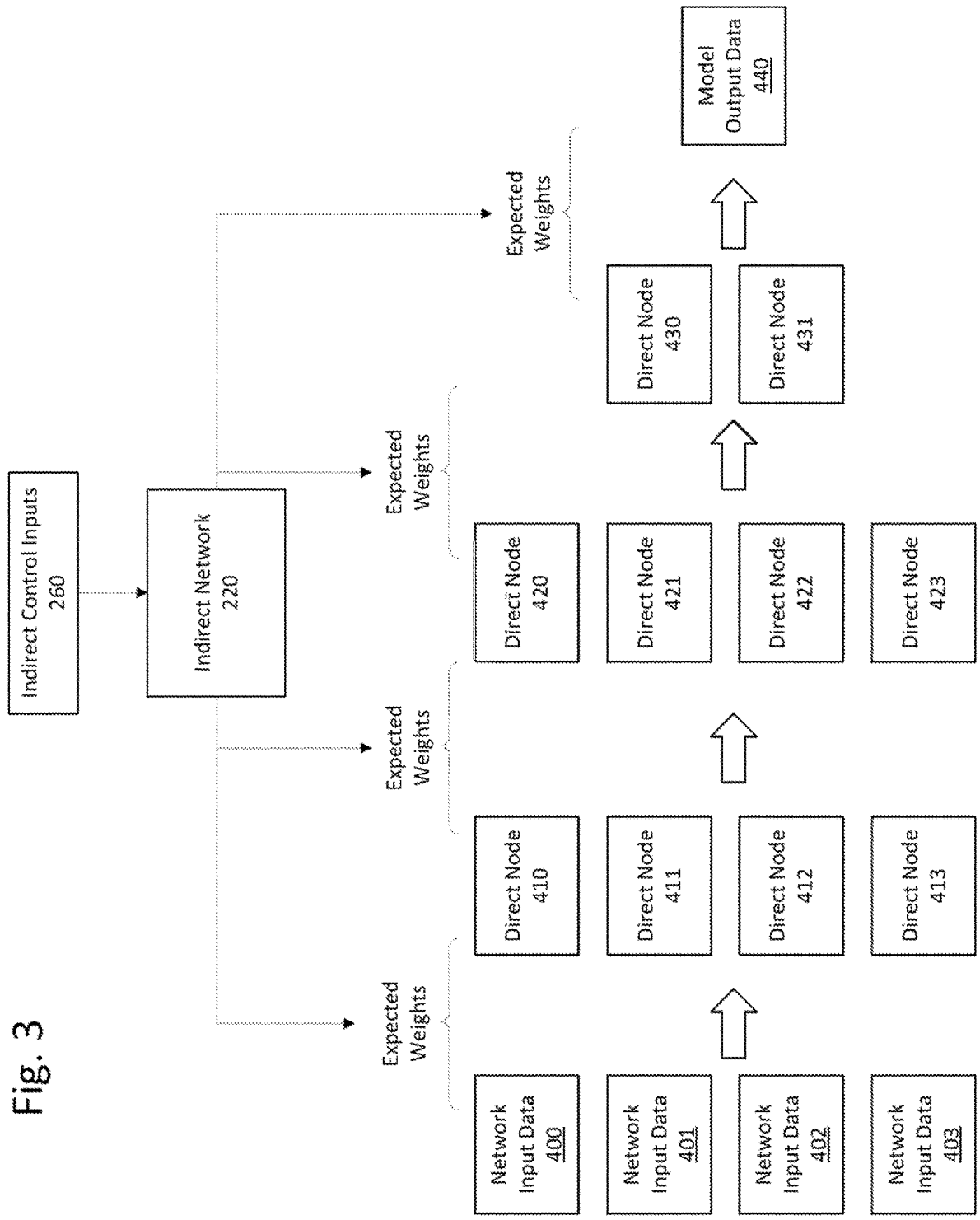
FIG. 3 illustrates an indirect network for a plurality of direct network layers, according to one embodiment.

FIG. 3 illustrates an indirect network for a plurality of direct network layers, according to one embodiment. In this example, the indirect network 220 generates expected weight distributions for nodes of the network model. In this example, the expected weight distributions may be generated for each separate layer or for each node within a layer. In this example, the network model includes several layers in which each layer includes one or more nodes. In this example, the initial data inputs are entered at an initial network input data layer 400-403, and are initially processed by a layer of direct nodes 410-413. The output of these direct nodes 410-413 are used as inputs to the next layer of direct nodes 420-423, which is used as an input to the direct nodes 430-431, and finally as inputs to a model output data node 440. With respect to each layer or each node, the "direct network" as shown in FIG. 2 may represent a single layer or node in the larger model, such that the expected weight distribution generated by the indirect network 220 are generated to account with respect to the inputs and outputs of that particular layer. To generate the expected weights for a given node, the indirect control inputs 260 specify the layer and an index of the node. Likewise, when training the indirect network, the error in expected weights may be propagated to the indirect network 220 and specify to which control inputs 260 (the particular node) the error is associated. By setting the indirect control inputs 260 to account for the location of the node within the network, the indirect network 220 may learn, through the indirect control inputs and indirect parameters, how to account for the more general ways in which the weights differ across the larger network of weights being predicted by the indirect network 220. Likewise, the varying control inputs may be used to learn ways other designated characteristics affect the weights, for example by designating a domain of a data set, a source of the data set, characteristics of a model or environment for the data set, and so forth. Though shown in FIG. 3 for varying locations in the network model, these different characteristics may likewise reflect common rules or themes which can be learned by the indirect network and applied to additional data sets. Accordingly, the indirect control inputs may additionally or alternatively reflect additional types of conditions that affect the output expected weight distribution as also discussed herein.

Returning to FIG. 2, as one use case of the indirect network, the weights of the direct network 200 may be regularized based on the expected weight distribution ⊖ of the direct network. When training the direct network, rather than a regularization function R that operates without knowledge of any expected weights for the system or automatically prefers low-value weights, the indirect network may be used to set expectations for the direct network weights and encourage the values of the direct network weights towards "more-likely" values. In addition, the indirect network may also be modified to generate an expected weight distribution that increases the likelihood of the direct network generating the expected result.

To perform this adjustment, the loss function for the direct network includes an error term for the expected output and the actual output for a data set, as well as a regularization term based on the expected weight distribution. Accordingly, the error term may describe:

$$L = E(y, \hat{y}) + \lambda R(w, \ominus) \qquad \text{Equation 6}$$

As shown in Equation 6, the error is a function of the training data output y with respect to the predicted output $\hat{y}$, and the regularization term is a function of the direct network weights and the expected weight distribution ⊖. When training the network, a data sample is evaluated by the direct network using the direct network weights w. The error for the direct network may be evaluated with respect to the direct network. The direct network weights w may be updated based on the loss function by the derivative of the loss function with respect to the direct network weights w. Since the loss function L includes the expected weight distribution ⊖, the update to the direct network weights w is encouraged towards likely values as reflected in the expected network distribution as provided by the indirect network. Likewise, the indirect parameters of the indirect network may be updated by determining the derivative of the loss function L with respect to the estimated weight distributions (and the indirect parameters generating the estimated weight distribution) and propagating the derivative to the indirect parameters. Accordingly, the error function thus permits the direct network to be "encouraged" towards the weights suggested by the indirect network, while also permitting deviation to account for the particular data processed by the direct network. Since the indirect network may be a simpler network or otherwise describe more general trends across various indirect control inputs, the training of the direct network to preference, but still deviate within, the expected weight distribution permits general description of the weights in the indirect network and accounting for particular data sets in the direct network.

As discussed further below, the regularization parameter λ may be an output (direct or derived) from the indirect network 220. Alternatively or in addition, the regularization parameter λ may also represent a noise variance or other data uncertainty that may be learned from the data set itself. In addition, the regularization parameter λ may vary according to the particular weight, layer, or node of the direct network (e.g., as output by the indirect network 220). In addition, the regularization parameter λ may represent a variance of the expected weight distribution ⊖.

The regularization function R may comprise various functions to represent different norms, such as an L1 or L2 norm, and may be any distribution or parametric loss function that may represent the direct network. Additional regularization functions include those corresponding to heavy-tailed or robust losses, binary losses for modeling binary weights, rich sparsity patterns for dropout, and other arbitrary explicit and implicit distributions and so forth. Primarily, the regularization function R used with the expected weight distribution discourages (but permits) the direct weights from being assigned less-likely weight values and encourage more-likely ones. Accordingly, various regularization functions R may be selected that increase the penalty for a direct weight based on how unlikely the direct weight is in the expected weight distribution, such that more-unlikely weights are penalized more than less-unlikely weights. E.g., the lower the probability of the weight, the higher the penalty.

In some embodiments, the regularization function R itself may be a learnable function from the indirect control inputs and the indirect parameters. That is, the regularization function R may itself be output from the indirect network function based on the expected weight distribution. As a result, the regularization function R may learn to evaluate the direct weight w according to the expected weight distribution and according to the likelihood of the direct weight w suggested by the data set training the model.

In one embodiment, the indirect network generates an expected weight distribution represented as a Gaussian model. In this example, the expected value for a weight $\hat{w}$ in the direct network is a mean of the Gaussian distribution, while a variance of the Gaussian distribution is used as the regularization parameter $\lambda$. This is illustrated in FIG. 2 as expected weights 222 and the regularization parameter $\lambda$ 224. In this example, the loss function may use the expected weight as an "anchor" or set point for the direct network weights w. As one example loss function for this embodiment:

$$\tilde{E}(w, \phi, \lambda, D) = E(w, D) + \lambda R(w, \hat{w}) \quad \text{Equation 7}$$

$$E(w, D) + \frac{\lambda}{2} \sum_{i=1}^{m} (w_i - \hat{w}_i(\phi))^2 - \frac{m}{2} \ln \lambda \quad \text{Equation 8}$$

In this example shown by equations 7 and 8, the error function includes an error term, a regularizer term, and in equation 8, a normalizer $$\left(\text{here, } \frac{m}{2} \ln \lambda\right).$$

The error term is a function of the direct network weights w and the input data. That is, based on the input data and the weights, a generated output $\hat{y}$ is compared with the known outputs y. The regularizer term represents the expected weights $\hat{w}$ as generated by the indirect network with indirect parameters $\phi$ with the expected weights encouraged with the regularization parameter $\lambda$, which may represent the variance of the distribution. The normalizer term may be used to account for the Gaussian distribution and normalize the Gaussian across the direct network; the number of weights m in the direct network is included to normalize, since each is modeled by a Gaussian.

To update the direct and indirect networks, the derivative is obtained with respect to the parameters of each network and applied to the parameters. As noted above, various types of parameter optimization and error propagation may be used to adjust the parameters, such as steepest gradient descent.

As one alternative, the weights may be updated by a linear combination of the unregulated weights w* and the expected weights $\hat{w}$ (or the expected weight distribution $\ominus$). The unregulated weights w* represent weights of the direct network for an error function in which the error function does not include a regularization term, and in certain cases may be based only on an error term measuring the difference between the training data output y and the generated output $\hat{y}$. The expected weights IP and the unregulated weights w* may be combined with coefficients $\tau$ and $\epsilon$ as shown:

$$w = \tau \hat{w}(\phi) + \xi w^* \quad \text{Equation 9}$$

As an alternative, the weights may also be a multiplicative combination of the expected weights IP and the unregulated weights w*:w=($\hat{w}$)*(w*). Other alternative or more complex combinatory functions may also be used to combine the indirect network outputs (e.g., the expected weight distribution) with the unregulated direct network weights W*.

Accordingly, one loss function for the linear combination may be represented as:

$$\tilde{E}(w,\phi,\lambda,D)=E(w,D)+\lambda\|w-\hat{w}(\phi)\|_p-C \quad \text{Equation 10}$$

In equation 10, C is a constant and the weights are regularized with an $L_p$ norm, although other regularizers may also be used as discussed above. By setting coefficients $\tau$ and $\epsilon$ between 0 and 1, these may additively determine the direct weights. In addition, the coefficients may be set in combination to equal 1.

Figure 4:
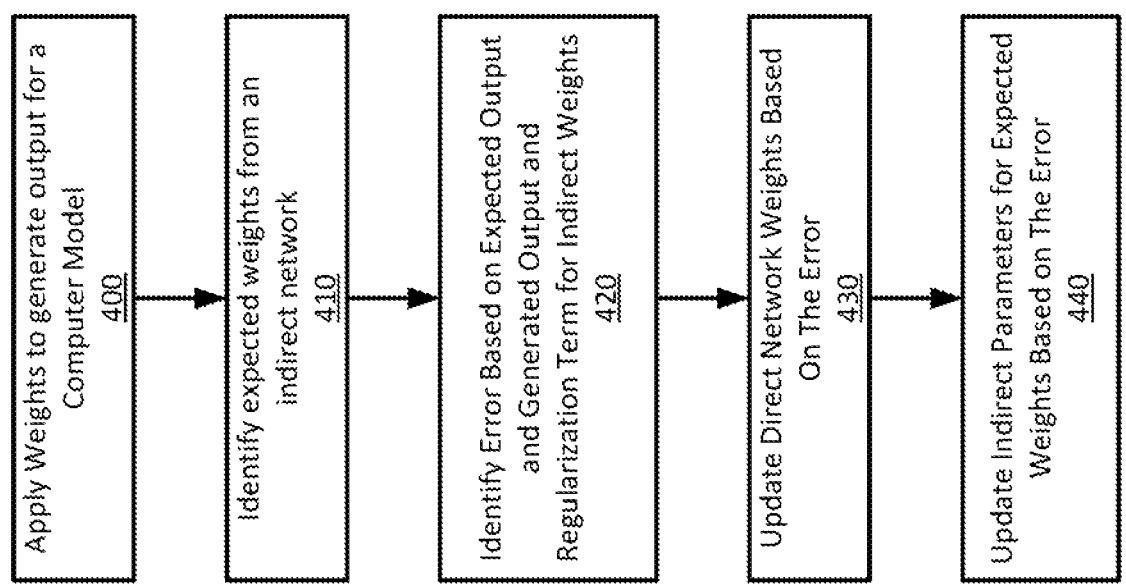
FIG. 4 illustrates a process for training weights of a direct network and associated indirect network, according to one embodiment.

FIG. 4 illustrates a process for training weights of a direct network and associated indirect network. Initially, the direct weights w and the indirect parameters $\phi$ are initialized. The process shown in FIG. 4 may be performed for one or more inputs x from a training dataset D each having an associated output y, for example as a batch of training data selected from D. Initially, the direct network weights w are applied to the input x to generate a model output $\hat{y}$. Next, the expected weights (or expected weight distribution) is identified for the indirect network 410, for example by processing the indirect parameters $\phi$ and, if applicable, the indirect control input z through the indirect network. Using the current direct network weights w, expected weights $\hat{w}$ (or the expected weight distribution $\ominus$, output y, and generated output $\hat{y}$, the error function is applied to identify 420 an error function. The direct network may be updated as discussed above, for example by determining the derivative of the error function with respect to the direct network weights and updating the weights according to a gradient descent or other update algorithm. One representation of the update 430 for the direct weights is:

$$w_t \leftarrow w_{t-1} - \frac{\partial \tilde{E}(w, \phi, D)}{\partial w}\bigg|_{w_{t-1}} \quad \text{Equation 11}$$

Likewise, one representation of the update 440 of the indirect parameters for the indirect parameters is:

$$\phi_t \leftarrow \phi_{t-1} - \frac{\partial \tilde{E}(w, \phi, D)}{\partial \phi}\bigg|_{\phi_{t-1}} \quad \text{Equation 12}$$

By evaluating the direct network weights with respect to an estimated weight distribution as provided by the indirect network, the direct network weights may thus be regularized to learned characteristics of the direct network, rather than regularizing to low weights or to a "simple" set of weights. This permits the direct network to include regularization for more generally describing the data set and while doing so more naturally to the general contours of the data set itself.

Figure 5:
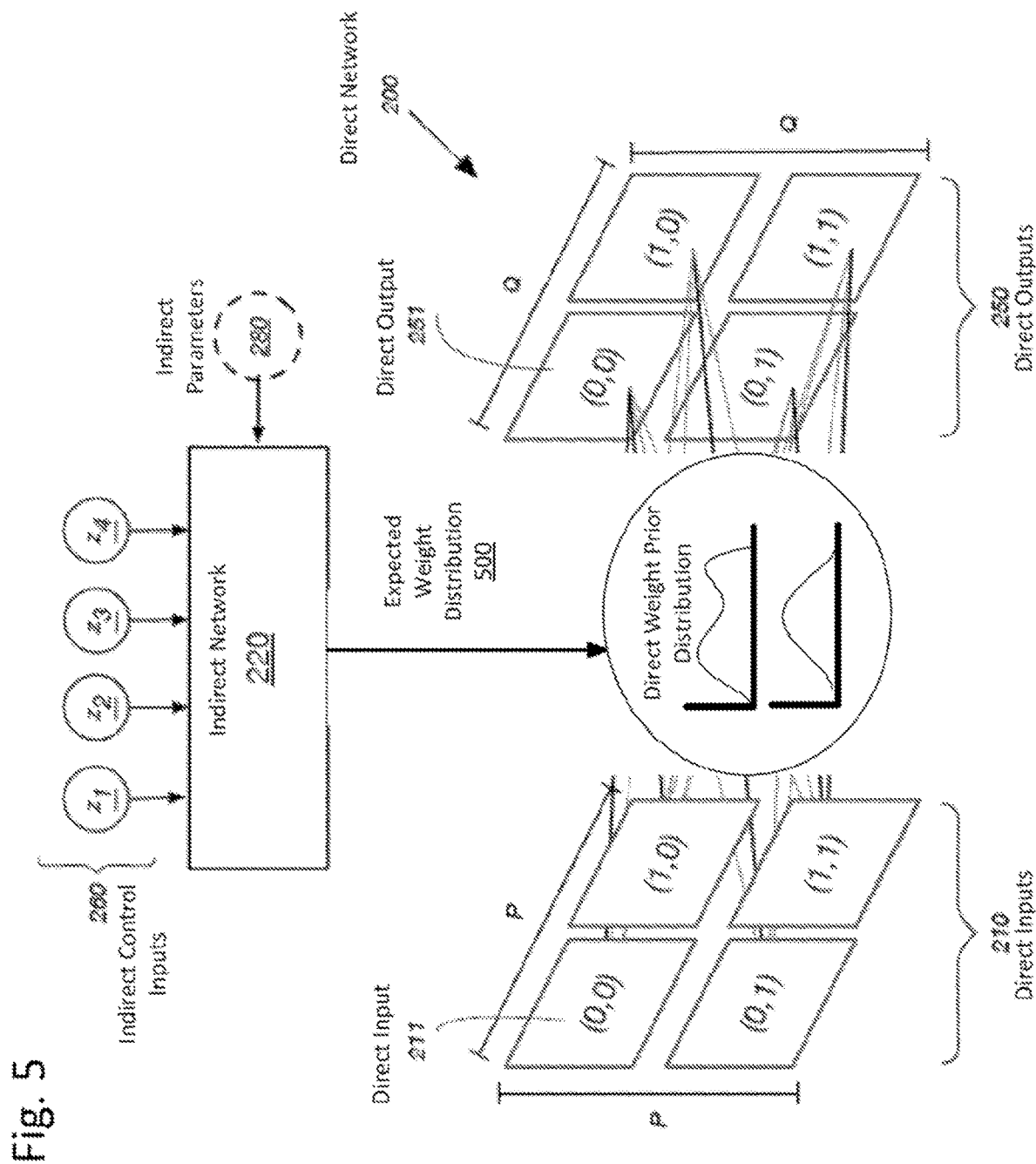
FIG. 5 illustrates an example in which the direct network is evaluated with the expected weight distribution provided by an indirect network, according to one embodiment.

FIG. 5 illustrates an example in which the direct network 200 is evaluated with the expected weight distribution provided by an indirect network 220 according to one embodiment. In this example, the indirect network 220 may have a similar structure as discussed above, and may receive indirect control inputs z 260 and indirect parameters $\phi$ 280. In this example, rather than designating a specific weight set w for the direct network, the expected weight distribution $\ominus$ 500 is used to model the possible weights for the direct network. To evaluate the direct network 200, rather than use a specific set of weights w, various possible weights are evaluated and the results combined to make an ultimate prediction by the weight distribution $\tilde{\Theta}$ 500 as a whole when applied to the direct network, effectively creating an ensemble of networks which form a joint predictive distribution. Conceptually, the generated output ŷ, is evaluated as the most-likely value of y given the expected distribution of the weight sets. Formally, y may be represented as an integral over the likelihood given an input and the expected weight distribution $\tilde{\Theta}$. The direct network output ŷ may also be considered as a Bayesian Inference over the expected weight distribution $\tilde{\Theta}$, which may be considered a posterior distribution for the weights (since the expected weight distribution is a function of training from an observed dataset). In training, the indirect parameters $\phi$ may be learned from an error of the expected weight distribution, for example by Type-II maximum likelihood.

In one example, the integration averages over all possible solutions for the output y weighted by the individual posterior probabilities of the weights: $P(\tilde{\Theta}|D)$, and thus may result in a better-calibrated and more reliable measure of uncertainty in the predictions. Stated another way, this inference may determine a value of output y as a probability function based on the direct network input x, the indirect control inputs z, and the indirect parameters $\phi$ or more formally: $P(y|x, z, \phi)$. In performing an integration across the probable values of y, the uncertainty of the direct weights is explicitly accounted for in the expected weight distribution $\tilde{\Theta}$, which allows inferring complex models from little data and more formally accounts for model misspecification.

Since an integration across the expected weight distribution may often be implausible, in practice, the direct network output y may be evaluated by sampling a plurality of weight sets from the distribution and applying the direct network to the sampled weight sets.

This posterior inference for the expected weight distribution and the indirect control parameters may be performed by a variety of techniques, including Markov Chain Monte Carlo (MCMC), Gibbs-Sampling, Hamiltonian Monte-Carlo and variants, Sequential Monte Carlo and Importance Sampling, Variational Inference, Expectation Propagation, Moment Matching, and varients thereof. In general, these techniques may be used to update the expected weight distribution according to how a modified weight distribution may improve an error in the model's output y. In effect, the posterior inference provides a means for identifying an updated expected weight distribution. Subsequently, the updated expected weight distribution may be propagated to adjustments in the indirect parameters $\phi$ for the indirect network that generate the expected weight distribution.

As one example embodiment, the posterior inference may be a variational inference, which approximates the inference based on a marginal likelihood. As noted, various such inference techniques may be used, and this is one example embodiment. In this approach, possible improved weight distributions are evaluated that improve the posterior approximation of the expected weight distribution. In this approach, an approximate distribution is evaluated $q(\tilde{\Theta})$ relative to a set of samples from the approximate distribution $q(\tilde{\Theta})$. The approximate distribution in this example can be evaluated in one embodiment by a loss function on the approximate distribution $q(\tilde{\Theta})$ given a prior distribution $p(\tilde{\Theta})$ of the set of weights. This loss function for a given approximate distribution $q(\tilde{\Theta})$ and indirect parameters $\phi$ given an input x, an output y, and indirect control inputs z:

$$\mathcal{L}(\Theta, \phi | y, x, z) = \int_{\tilde{\Theta}} \log p(y | x, \tilde{\Theta}, z) q(\tilde{\Theta} | z) d\tilde{\Theta} - KL(q(\tilde{\Theta} | z) \| p(\Theta) | z)$$

Equation 13

The initial term is a data term that describes the fit of the distribution with weights sampled from (represented as an integral) the variational distribution $q(\tilde{\Theta}|z)$. The second term is a regularization term expressed as a KL-divergence between the current approximate distribution $q(\tilde{\Theta})$ and its prior distribution $p(\tilde{\Theta})$. To approximate the data term integral, a number L of samples of the data term $\{\tilde{\Theta}^1, \tilde{\Theta}^2, \tilde{\Theta}^3, \ldots, \tilde{\Theta}^L\}$ may be used to approximate the data term:

$$\int_{\tilde{\Theta}} \log p(y | x, \tilde{\Theta}, z) q(\tilde{\Theta} | z) d\tilde{\Theta} \approx \sum_{l=1}^{L} \log p(y | x, \tilde{\Theta}^l | z)$$

Equation 14

By integrating the loss function with respect to the approximate distribution $q(\tilde{\Theta})$, an updated expected weight distribution of the direct network may be evaluated and used to update the indirect parameters $\phi$ for subsequent evaluation. For example, the derivative of the loss function may be taken with respect to the expected weight distribution to update the expected weight distribution:

$$\theta_t \leftarrow \theta_{t-1} - \frac{\partial \mathcal{L}(\Theta_{t-1}, \phi_{t-1}; \epsilon_t, D_t)}{\partial \theta_{t-1}}$$

Equation 15

Likewise, the derivative of the indirect parameters may be taken with respect to the loss function (and potentially with respect to the updated expected weight distribution) as shown:

$$\theta_t \leftarrow \theta_{t-1} - \frac{\partial \mathcal{L}(\Theta_{t-1}, \phi_{t-1}; \epsilon_t, D_t)}{\partial \phi}$$

Equation 16

Figure 6:
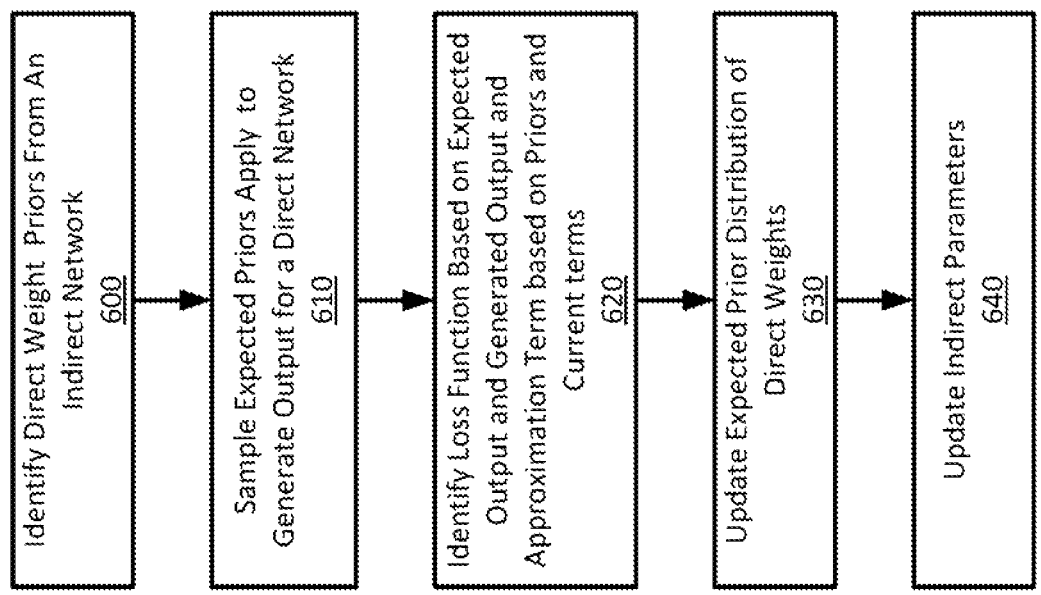
FIG. 6 illustrates a process for training an indirect network to generate an expected weight distribution for a direct network to be evaluated by the expected weight distribution, according to one embodiment.

FIG. 6 illustrates a process for training an indirect network to generate an expected weight distribution for a direct network to be evaluated by the expected weight distribution, according to one embodiment. Initially, the indirect network weights or "priors" may be set initialized by the indirect network, for example to zero. To begin training for a data sample or batch, the direct weight distribution or prior is identified 600 from the indirect network, for example based on the control inputs and indirect parameters $\phi$. Next, the prior distribution is sampled 610 to identify a plurality of possible weight sets for the direct network and generate outputs for the weight sets, reflecting potential outputs of the direct network. A loss function is identified 620 and applied to evaluate the loss of the expected weight distribution and a potential approximation of an updated weight distribution. The expected prior distribution (e.g., the expected weight distribution) is updated 630 based on an evaluation and identification of an approximation of the updated weight distribution that improves the error of the generated output from the sampling of the distribution approximation. For example, a derivative of the distribution may be used with respect to an error function for the approximate weight distribution. In addition, the indirect parameters used by the indirect network to generate the distribution are also updated 640.

By modeling the uncertainty in the direct network with the indirect network, the indirect network provides additional flexibility in training the direct network and additional ability of the trained network to avoid biases from initial training sets. In addition, since the indirect network represents characteristics of the direct network generally, the indirect network may also be used for transfer learning of other related data sets. Rather than begin anew, the indirect network from the initial data set may be re-used to provide some initial characterization of the new data set. In addition, the control inputs of the indirect networks may designate the domain of the different data sets, permitting the control parameters to quickly learn characteristics of the new data set because it differs in the control parameter, but may not differ in other control parameters of the network. Likewise, incorporating characteristics of an environment into the control parameters may allow the model to quickly acclimate to new environments. For example, when the control parameters describe physical characteristics, such as an image field of view, viscosity, or the effect of gravity, the indirect network may readily learn how these characteristics affect the expected weight distribution of the direct network, particularly when the change in the characteristic may be known.

In further embodiments of the examples shown in FIG. 2 and FIG. 5 (e.g., with or without directly-trained weights), rather than using statically-determined control inputs, the control inputs to the indirect network may be treated as hidden or latent codes which control the generation of the indirect network. In this example, the input code for a given direct network may be inferred from the training data based on the different indirect parameters suggested by the various training data. By permitting the control input to represent unknown or hidden state, variations in the input data may be used to learn a most-likely posterior distribution of the indirect control inputs. This may permit additional data sets to effectively leverage the more general structural characteristics of the direct network as reflected in the indirect parameters by identifying the appropriate control input for the additional data sets. To parameterize a latent control input, the error function may incorporate the latent code in the regularizer and perform gradient descent with respect to the latent code to identify likely latent codes for different data. For example, the error function may be represented by:

$$\tilde{E}(w,z,D) = \tilde{E}(w,D) + \lambda_z R_z(z,\hat{z})$$ Equation 17

In this example, the regularizer itself may be weighted by a regularization parameter z that is dependent on the latent code.

When using Bayesian Integration, the solutions for z may be integrated to evaluate a joint posterior distribution for the indirect parameters $\phi 0$ as well as the latent control input z:

$$P(y \mid x; \phi) = \int_\Theta P(y, \Theta \mid x; \phi) d\Theta = \int_\Theta \int_z P(y \mid x, \Theta) P(\Theta \mid z; \phi) P(z) dz d\Theta$$ Equation 18

Using the latent control inputs may permit general formulations of the expected weight distributions and permitting the expected weight distributions to reflect how different data sets generate different weight distributions without a priori knowledge of the latent 'state' of the data sets.

As one use of such latent control inputs, the indirect control inputs z may be only partially latent and may include control inputs that describe a domain or subdomain of a data set as noted above. In this example, the domain terms may be fixed for structural modifications of the network, but vary across data sets. For a given data set, the domain term may be constant, and the subdomain may vary. In this way, the latent indirect control inputs may be generated and evaluated for the domain or subdomain of the data set, and the parameters and latent indirect control inputs may more effectively capture how the expected value of direct weights are modified across different applications and domains.

Though discussed with respect to certain network structures, loss functions, error and regularization terms, additional variations of these features may also be used to provide flexibility in predicting the characteristics of a direct network.

Using the indirect network to generate an expected weight distribution or expected weights for the direct model provides many advantages and applications of computer models. Some examples are discussed below for transfer learning, learning from limited data sets, 'repairing' mappings, and adjusting for changes in incoming input data.

Transfer Learning: First, the indirect network aids in the generation of transfer learning for different tasks. Since the indirect network predicts general expected characteristics of a network, the parameters for the indirect network may be used as initial expected parameters for training additional direct networks for different tasks. In this example, the indirect network may be used to initialize the weights for another direct network. As another example, the domain of a task or data set may be specified as a control input z, either with or without latent control inputs. This permits the indirect network to be re-used for similar types of data and tasks in transfer learning by re-using the indirect network trained for an initial task. When training for additional types of tasks or domains, the modified control input may permit effective and rapid learning of additional domains because the training for the new domain may only require learning the differences from the prior domain while re-using the previously-learned aspects of the general data as reflected in the trained indirect control parameters $\phi$. In addition, the control inputs z may define known properties or parameters of the environment in which the direct network is applied, and changes to those properties may be used to learn other data sets having other properties by designating the properties of the other data sets when learning the new data sets.

Such a control input z may be a vector describing the relatedness of tasks. For many purposes that can be an embedding of task in some space. For example, when trying to classify animals we may have a vector containing a class-label for quadrupeds in general and another entry for the type of quadruped. In this case, dogs may be encoded as [1,0] and cats as [1,1] if both are quadrupeds and differ in their substructure. The indirect network can describe shared information through the quadruped label "1" at the beginning of that vector and can model differences in the second part of the vector. Another example is weather prediction, where the control input z can be given by time of year (month, day, time, and so forth) and geographical location of the location we care to predict at. More generally, z can also be a learned vector without knowing the appropriate control inputs a priori, as long as we can share them between tasks. Explicitly, z can also be predicted from the direct input x. An example of this is images taken from a camera with different weather conditions and a network predicting the appropriate control input z to ensure that the indirect network instantiates a weather-appropriate direct network for the relevant predictive task.

In other examples, the indirect network is jointly trained with multiple direct networks for different tasks, permitting the indirect network to learn more general 'rules' for the direct networks and reflect an underlying or joint layer for the direct networks that may then be individual direct weights for individual direct networks for individual tasks. In this example, one of the control inputs z may specify the direct network (e.g., relating to a particular task) for the indirect network applied (known parameters would be classes as above or geographical location or other covariates related to the process at hand). An example of this may be instantiated as a predictive task across cities where a company may operate. If the predictive task relates to properties of cities, such as a spatiotemporal supply and demand prediction for a ridesharing platform does, one can utilize the indirect network by deploying it across cities jointly and using the different city-specific variables as inputs to improve local instances of the forecasting model. City-specific inputs may be related to population density, size, traffic conditions, legal requirements and other variables describing information related to the forecasting task.

One-shot Learning: as an additional benefit, the use of the indirect network to generate expected weights or general distributions of the direct networks also permits the indirect network to be trained more accurately with more limited training data. In particular, where an indirect network had been generated for a task, related task, or related data set, a direct network may be trained (or the expected weight distribution $\ominus$ updated for the direct network) for a new data set quickly. According, even when a small amount of data is known for a particular task, the direct network may be effectively trained, and in some examples, by a single data set ("one-shot") using the indirect network. In addition, even when no prior direct network parameters are known, because the indirect network reflects a more general expected weight distribution of the direct weights, a single data set or batch may be more effectively train the model as a whole because the indirect network naturally generalizes (regularizes) from the specific data. An example of this is when having a robot or autonomous agent act in unconstrained environments it has not previously been trained on. If, for example, an autonomous agent has access to a strong model previously learned for related tasks and is exposed to a novel environment, for instance a street-network with previously unseen properties of visual nature or previously unseen obstacles or legal requirements, an ideal learner can adapt previously learned rules in the indirect network rapidly to changes in the new environment. For instance, if the speed limit has been changed only one example of the new speed limit could suffice to learn a speed controller if the indirect network contains an input related to speed limits.

Model Compression: The indirect network may also be used to shrink the total size of a computer model while maintaining high predictive power for the outputs. Because the indirect network generates the expected weight distribution $\ominus$, the indirect network parameters may be used as a "compressed" form of describing direct network weights without a system needing to store a complete set of direct network weights. To apply and use the network, the indirect network parameters $\phi$ and control inputs z may be applied to generate the expected weight distribution $\ominus$ for a particular direct network when required for application of the model and thereby avoid pre-storage of a large number of direct network weights w, and in some examples the expected weight distribution $\ominus$ itself is not stored and may be generated at run-time for a model. The expected weight distribution $\ominus$ may be probabilistically evaluated, for example through sampling, as discussed above to determine an input as discussed with respect to FIGS. 5 and 6.

Direct Network Flexibility: In some cases, the direct network(s) have reduced efficacy due to data loss of the weights of the direct network itself, or because a portion of the inputs or outputs of the direct network are missing, become unreliable, or become ineffective. The indirect network may be used in these cases to improve the prediction of the direct network and permit the direct network to be modified for these problems. If portions of a trained direct network are lost or no longer describe current data well, the indirect network can provide a "starting place" for the direct network weights without complete re-training of the direct network. In this example, when a system identifies that portions of the direct network are lost or missing, the system may replace those weights based on the expected weight distribution $\ominus$ from the indirect network. The expected weight distribution $\ominus$ corresponding to that potion of the direct network may be used in lieu of the direct network weights. For example, the average or mean of the expected weight distribution may be identified and replace the missing or lost weights. In this way, the system can replace the missing direct weights with a learned approximation from the indirect network. In this example, the direct network weights may then be applied with a combination of the learned weights w that were known (e.g., not missing) and expected weights $\hat{w}$ (e.g., when weights w are missing).

Relatedly, when input data is missing or erroneous, the indirect network may be used to adapt the direct network to account for the missing input data. This may occur when portions of the input x are generated from or derived by sensor data, and those sensors have become unreliable or broken. In many control scenarios, an evaluation of that data as though it were present may have significant implications for control of a device if the output of the network errs when the data is missing.

To adaptively account for this missing data, when the input data is missing or erroneous, the direct network weights may be adjusted or modified based on the lack of that input data to prioritize a weight distribution from the expected weight distribution that more-heavily uses the other portions of the input to generate the output. When the expected weight distribution $\ominus$ is jointly determined for several weights, certain distributions may represent higher or lower dependence on different inputs for evaluating the output. When that input data is missing, the portions of the direct network that use the missing or erroneous data as inputs, have high expected weights for that data, or high weight distributions that weigh that data highly, may be deactivated or adjusted to account for the missing data based on the expected weight distribution $\ominus$. For example, the expected weight distribution $\ominus$ for the direct network may be evaluated and modified to reduce reliance on (or deactivate) portions of the direct network affected by the missing data. For example, an expected weight distribution $\ominus$ for a direct network may be modified to exclude portions of the distribution that highly weigh the missing or affected inputs. Accordingly, the expected weight distribution $\ominus$ from the indirect network to identify and use 'alternate' weights for the direct network when inputs to the direct network become unreliable.

In an illustrative example, a vehicle, such as a fully or partially autonomous car or aircraft, can include a vehicle controller that receives sensor data as input and generates actuator commands as output. For instance, a vehicle controller for a car may receive as sensor data one or more of position, speed, acceleration, heading, and heading rate, and it may generate as actuator commands one or more of steering angle, throttle setting, and brake settings. A vehicle controller for an aircraft may receive as sensor data one or more of positional data, velocity, acceleration, angular orientation, and angular rates and it may generate as actuator commands one or more of control surface deflections (e.g., elevator, ailerons, elevens, rudder) and throttle settings.

The vehicle controller can be implemented by a direct network, such as the direct network 220 of FIG. 2. Furthermore, the vehicle system can include a controller reconfiguration module that includes the indirect network for adjusting or adapting the direct network of the vehicle controller. For example, the controller reconfiguration module can receive information indicative of the health of the vehicle (e.g., sensors, actuators, vehicle components such as tires). This information can be used to generate the indirect control input z. Each component of z can represent a particular sensor, actuator, or other component of the vehicle. The components can represent the health in a binary manner (e.g., 1 represents a healthy component and 0 represents a completely failed component) or in a continuous manner. Alternatively or additionally, there may be a component that represents the operational mode of each component (e.g., a first state represents nominal operation, a second state can represent a stuck sensor (constant sensor output) or actuator (fixed actuator state), a third state can represent a floating actuator (e.g., there is no control over the actuator and it is free to move based on external forces), a fourth state can represent a noisy sensor, and so on).

The vehicle system may also include a fault monitoring systems that generates an output that provides information related to the health or performance of the vehicle's sensors and/or actuators. The fault monitoring system can operate in real time based on signals generated by or measurements of the sensors, actuators, or other components of the vehicle. This vehicle health information can be provided to the controller reconfiguration module to generate the indirect control input z of the indirect network. Some sensors and actuators include systems to report health status. This information can be used as input to the fault monitoring system The above vehicle system comprising the vehicle controller, controller reconfiguration module, and fault monitoring system can adjust the controller in real-time or online based on conditions of the vehicle. In this way, the controller can be robust to a wide variety of failure modes and vehicle dynamics.

Figure 7:
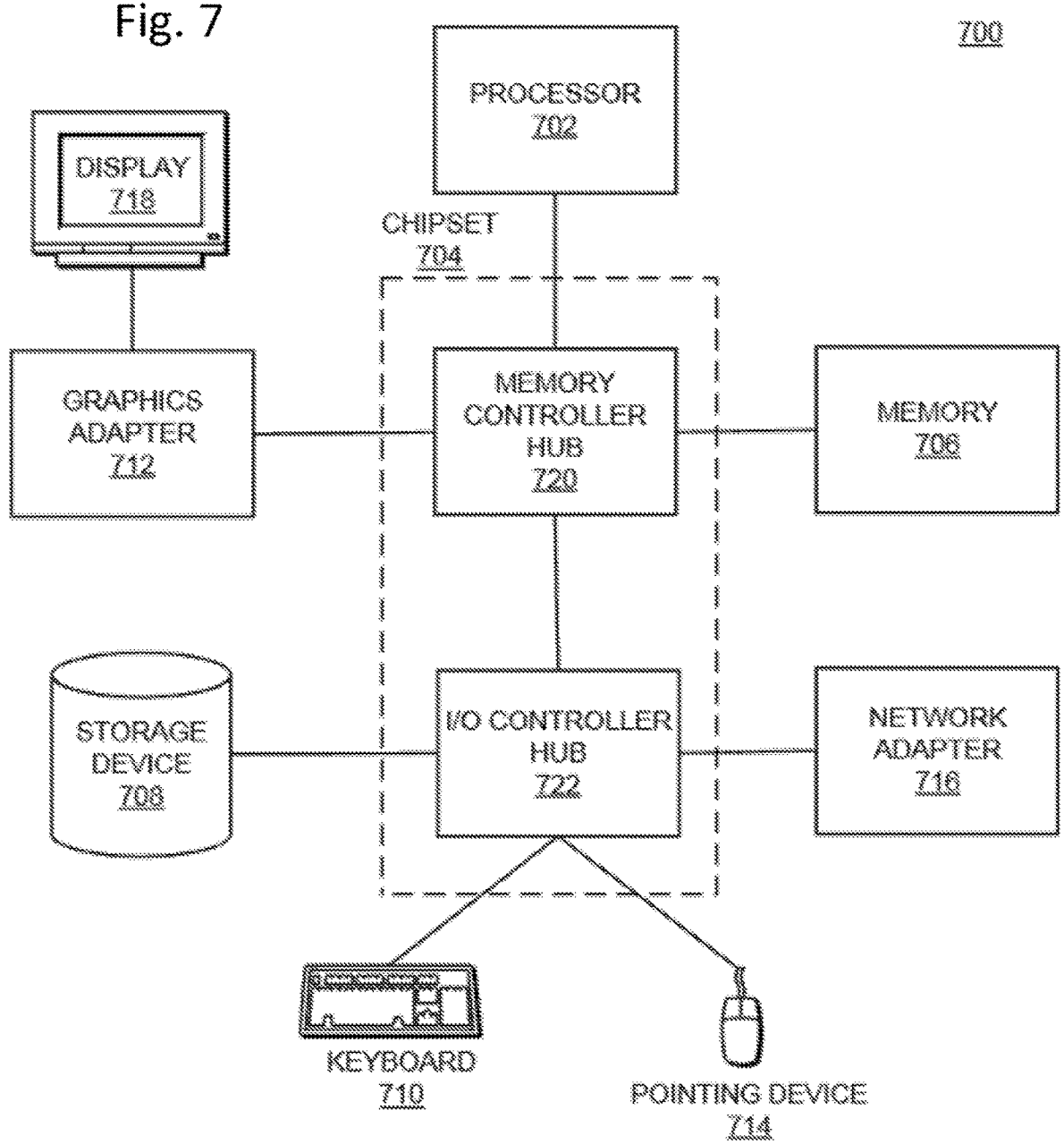
FIG. 7 is a high-level block diagram illustrating physical components of a computer used to train or apply direct and indirect networks, according to one embodiment.

FIG. 7 is a high-level block diagram illustrating physical components of a computer 700 used to train or apply computer models such as those including a direct and indirect network as discussed herein. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700, such as a host or smartphone, may lack a graphics adapter 712, and/or display 718, as well as a keyboard or external pointing device. Moreover, the storage device 708 can be local and/or remote from the computer 600 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer-readable medium storing instructions that, when executed by a computing system, cause the computing system to perform operations comprising:
    receiving a set of direct inputs;
    providing the set of direct inputs to a direct network having a set of weights, wherein the set of weights were trained by a process including:
        setting initial values for the set of weights;
        processing training input using the initial values to generate training output;
        obtaining distributions of a set of expected weights for the direct network, the distributions of set of expected weights generated by an indirect network using a set of indirect parameters, wherein at least some of the set of indirect parameters for a node describe a location of the node within the direct network by specifying a layer and an index of the node;
        identifying an error between an expected output and the training output generated from the direct network; and
        updating the set of weights based on the error and the distributions of the set of expected weights; and
    generating, by the direct network, a direct output from the direct network, using the set of weights.

2. The non-transitory computer-readable medium of claim 1, wherein the indirect network applied the set of indirect parameters to a set of indirect control inputs corresponding to a characteristic conditioning a generation of the set of expected weights from the set of indirect parameters.

3. The non-transitory computer-readable medium of claim 2, wherein the characteristic includes one or more of: a location on an image, or a type of input of the direct network.

4. The non-transitory computer-readable medium of claim 2, wherein the indirect network is configured to also generate another set of expected weights for another neural network having a different characteristic.

5. The non-transitory computer-readable medium of claim 1, wherein the operations further comprise updating the set of indirect parameters using a derivative of the error with respect to the set of indirect parameters.

6. The non-transitory computer-readable medium of claim 1, wherein the set of weights is updated based on an unregulated set of weights and the set of expected weights.

7. The non-transitory computer-readable medium of claim 6, wherein the set of weights is updated by a linear combination of the unregulated set of weights and the set of expected weights.

8. The non-transitory computer-readable medium of claim 1, wherein the indirect network is a parametric model.

9. A method comprising:
    receiving a set of direct inputs;
    providing the set of direct inputs to a direct network having a set of weights, wherein the set of weights were trained by a process including:
        setting initial values for the set of weights;
        processing training input using the initial values to generate training output;
        obtaining distributions of a set of expected weights for the direct network, the distributions of the set of expected weights generated by an indirect network using a set of indirect parameters, wherein at least some of the set of indirect parameters for a node describe a location of the node within the direct network by specifying a layer and an index of the node;
        identifying an error between an expected output and the training output generated from the direct network; and
        updating the set of weights based on the error and the distributions of the set of expected weights; and
    generating, by the direct network, a direct output from the direct network, using the set of weights.

10. The method of claim 9, wherein the indirect network applied the set of indirect parameters to a set of indirect control inputs corresponding to a characteristic conditioning a generation of the set of expected weights from the set of indirect parameters.

11. The method of claim 10, wherein the characteristic includes one or more of: a location on an image, or a type of input of the direct network.

12. The method of claim 10, wherein the indirect network is configured to also generate another set of expected weights for another neural network having a different characteristic.

13. The method of claim 9, further comprising, updating the set of indirect parameters using a derivative of the error with respect to the set of indirect parameters.

14. The method of claim 9, wherein the set of weights is updated based on an unregulated set of weights and the set of expected weights.

15. The method of claim 14, wherein the set of weights is updated by a linear combination of the unregulated set of weights and the set of expected weights.

16. The method of claim 9, wherein the indirect network is a parametric model.

17. A computing system comprising:
    one or more computer processors; and
    a non-transitory computer-readable medium storing instructions that, when executed by the computing system, cause the computing system to perform operations comprising:
        receiving a set of direct inputs;
        providing the set of direct inputs to a direct network having a set of weights, wherein the set of weights were trained by a process including:
            setting initial values for the set of weights;
            processing training input using the initial values to generate training output;
            obtaining distributions of a set of expected weights for the direct network, the distributions of the set of expected weights generated by an indirect network using a set of indirect parameters, wherein at least some of the set of indirect parameters for a node describe a location of the node within the direct network by specifying a layer and an index of the node;

identifying an error between an expected output and the training output generated from the direct network; and updating the set of weights based on the error and the distributions of the set of expected weights; and generating, by the direct network, a direct output from the direct network, using the set of weights.

18. The computing system of claim 17, wherein the indirect network applied the set of indirect parameters to a set of indirect control inputs corresponding to a characteristic conditioning a generation of the set of expected weights from the set of indirect parameters.

19. The computing system of claim 18, wherein the characteristic includes one or more of: a location on an image, or a type of input of the direct network.

20. The computing system of claim 18, wherein the indirect network is configured to also generate another set of expected weights for another neural network having a different characteristic.

* * * * *